W. WALKER.
Safety Attachments for Winding-up Ropes of Mines.
No. 157,773. Patented Dec. 15, 1874.
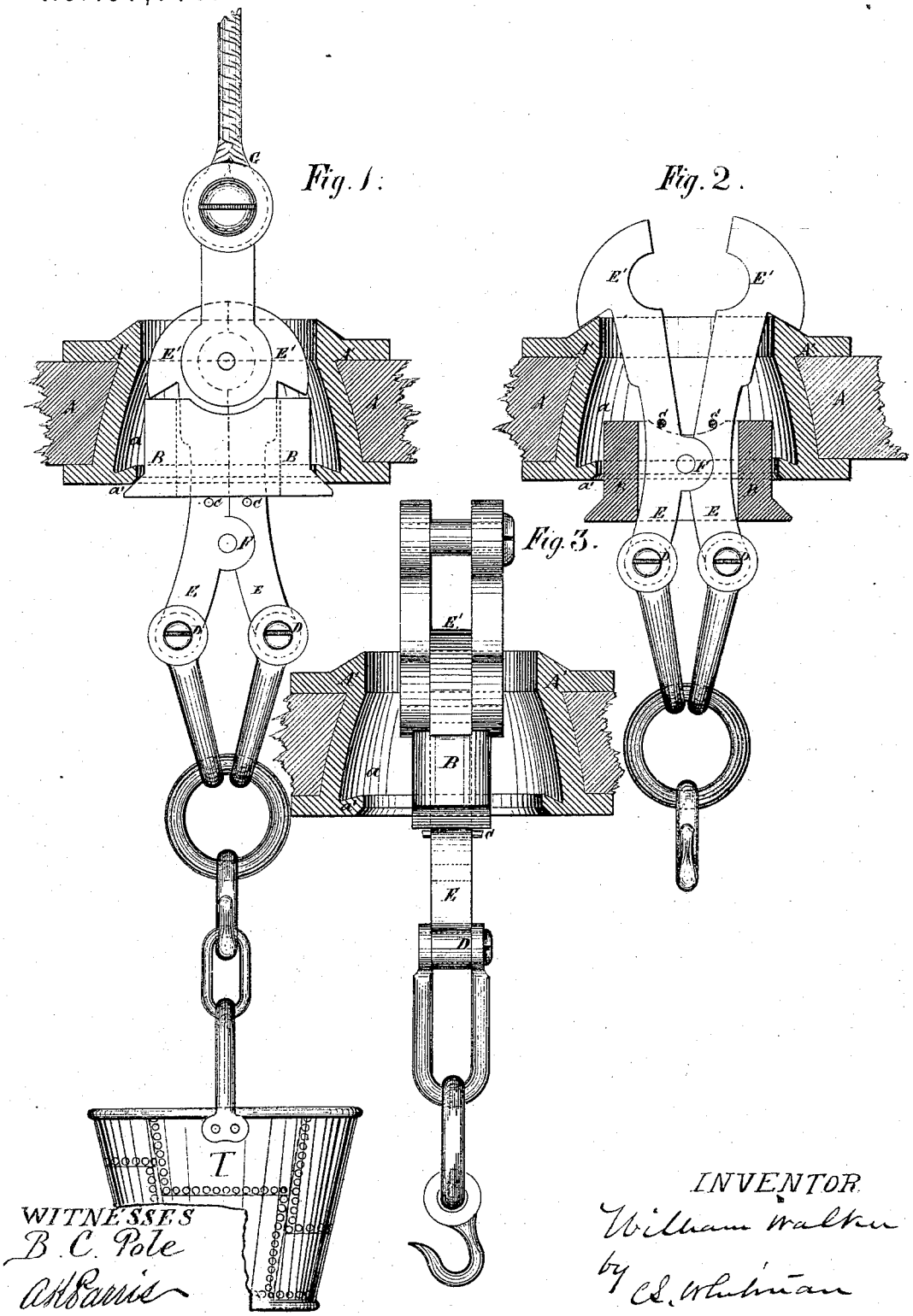
WITNESSES
B. C. Pole
A. H. Parris
INVENTOR
William Walker
by C. S. Whitman

UNITED STATES PATENT OFFICE.

WILLIAM WALKER, OF SALTBURN-BY-THE-SEA, ENGLAND.

IMPROVEMENT IN SAFETY ATTACHMENTS FOR WINDING-UP ROPES OF MINES.

Specification forming part of Letters Patent No. 157,773, dated December 15, 1874; application filed October 16, 1874.

*To all whom it may concern:*

Be it known that I, WILLIAM WALKER, of Saltburn-by-the-Sea, in the county of York, England, have invented an Improved Safety Apparatus for preventing accidents from over winding in mines and other localities; and do hereby declare that the following description, taken in connection with the accompanying sheet of drawings hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

My invention has reference to an improved construction of that description of safety apparatus for preventing accidents from overwinding in mines and other localities, whereby the winding rope or chain is disconnected from the load, while at the same time the load is supported by the apparatus so as to be prevented from falling after the rope or chain has been disconnected.

I construct such apparatus of two links or levers hinged together at or about the middle of their length, and so formed that when the upper parts of the links are close together the lower parts project at an angle from each other. The upper ends of the links are so formed as to hold the winding rope or chain between them when kept close together, and to release the same when opened out. They are also formed with heads or projections on their outer sides for a purpose to be presently described. The lower ends of the links are formed with eyes or pins, carrying chains or ropes, by which the bucket, cage, or other load to be raised is connected thereto. Over the two links is slid a guard-plate, having an aperture, through which the links pass. This guard-plate projects somewhat on each side of the head of the links, and is, under ordinary circumstances, situated close under such head, the aperture thereof being of such a size as to keep the upper part of the links close together, and the guard-plate is maintained in this position by soft-metal pins passing through holes in the links immediately underneath the guard-plate. At the point beyond which the load must not be raised is fixed a beam having an aperture through which the winding rope or chain passes, which aperture is just large enough to let the head of the before-described safety apparatus pass through. Should overwinding take place the upper parts of the links are drawn by the rope or chain through the said aperture in the beam, but the guard-plate, in coming in contact with the under side of the beam, is retained there while the links are drawn through it; whereby, first, the soft-metal pins are sheared off; and, secondly, when the links have passed through to the point where they are hinged together, the guide-plate in sliding over the lower distended parts of the links draws these close together, and thereby causes the upper ends, which are now situated above the top of the fixed beam, to open out and to release the winding rope or chain, while the projections or heads of the links at the same time take a bearing upon the upper side of the beam, and thus sustain the load after the winding-rope is disconnected.

On the accompanying sheet of drawings, Figure 1 shows a front view of my before-described improved safety apparatus. Fig. 2 shows the same view when the apparatus has been drawn through the stop-beam and the winding-rope released, and Fig. 3 shows a side view of the apparatus.

E E are the two links or levers hinged together at F, the upper parts of which are held together, in the position shown at Fig. 1, while in the act of winding, by the guard-plate or collar B, through a slot in which the links pass, the guard-plate being kept in position upon the links by soft-metal pins C C inserted through holes in the links. When in this position the heads E' E' of the links hold the winding rope or chain G securely between them in the notches formed for this purpose in their meeting surfaces, and their lower ends diverge at an angle, as shown, and have pins or holes D, to which the load T to be raised is attached. A is a fixed beam, situated at the point beyond which the load T should not be raised. It has a socket, $A^1$, with an opening just large enough to allow the heads E' of the links to pass through it.

When, through overwinding, the guard-plate B comes in contact with the under side of the socket $A^1$, as shown at Fig. 1, the links E E will be drawn by the rope or chain through the guard-plate and up through the opening $A^1$, the pins C C being sheared off by the plate B, and as the links pass through the guard-plate beyond the point F, where they are hinged together, their lower ends will be drawn together, thus causing the upper ends to open out. The winding-rope G is by this means released from the apparatus, and this, in dropping somewhat, takes a bearing with its heads $E'$ upon the upper side of the socket $A^1$, as shown at Fig. 2, so as to sustain the load after the winding rope is disconnected.

The socket $A^1$ is hollowed out at $a$, provided with a projecting rim, $a'$, at bottom, so that should, by inadvertence, the winding-engine be reversed after the pins C C are sheared off, and before the heads $E'$ reach the top of the socket, the links E in descending will catch with their heads $E'$ on the rim $A^2$, and the load will remain suspended in perfect safety.

Having thus described the nature of my invention, and in what manner the same is to be performed, I wish it to be understood I am aware that an arrangement of safety apparatus with hinged links has already been proposed, which links, in being drawn through an opening in a fixed beam, have their lower ends brought together by the side surfaces of the said opening, and their upper ends opened out so as to release the winding rope or chain, and I do not, therefore, claim such an arrangement; but

What I claim is—

1. The before-described construction of safety apparatus for preventing overwinding in mines, consisting of two hinged links, E E, with projecting heads $E'$ $E'$, operating in combination with the guard-plate B and pins C C, substantially as hereinbefore set forth.

2. The socket $A^1$, with hollow $a$ and rim $a'$, operating in combination with the links E and guard-plate B, substantially as hereinbefore set forth.

In testimony whereof I have signed my name to this specification in the presence of two subscribing witnesses this first day of September, 1874.

WILLIAM WALKER.

Witnesses:
    JNO. REED,
        *Accountant, Middlesbrough.*
    THOS. BRADLEY,
        *Agent, Middlesbrough.*